Figure 1:
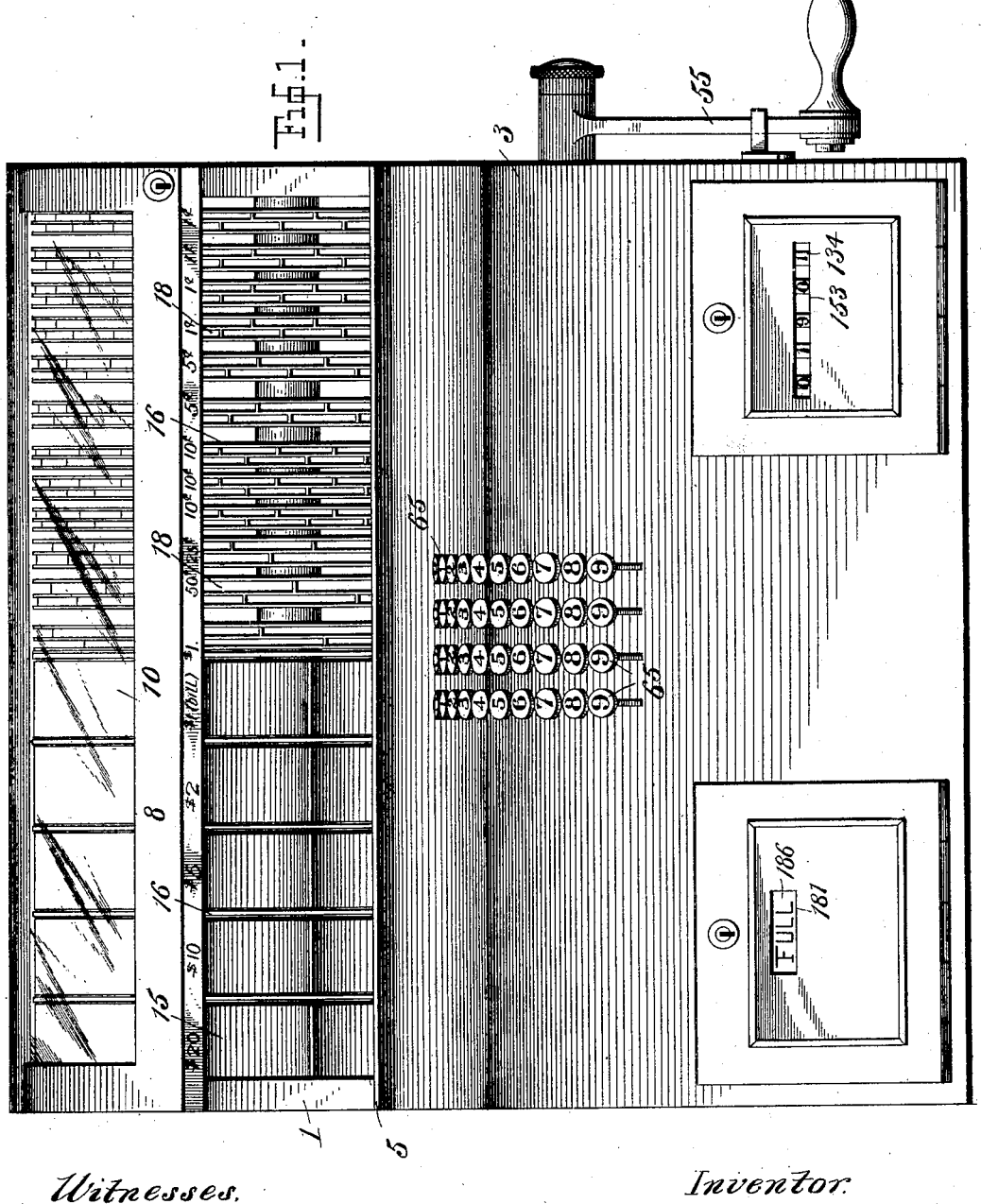

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 1.

Witnesses.
Wm. A. Courtland
Hm. P. Hammond

Inventor.
Charles F. Bassett
by
Attys

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 2.

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 3.

Witnesses.
Inventor.
Charles F. Bassett
by
Attys.

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 4.
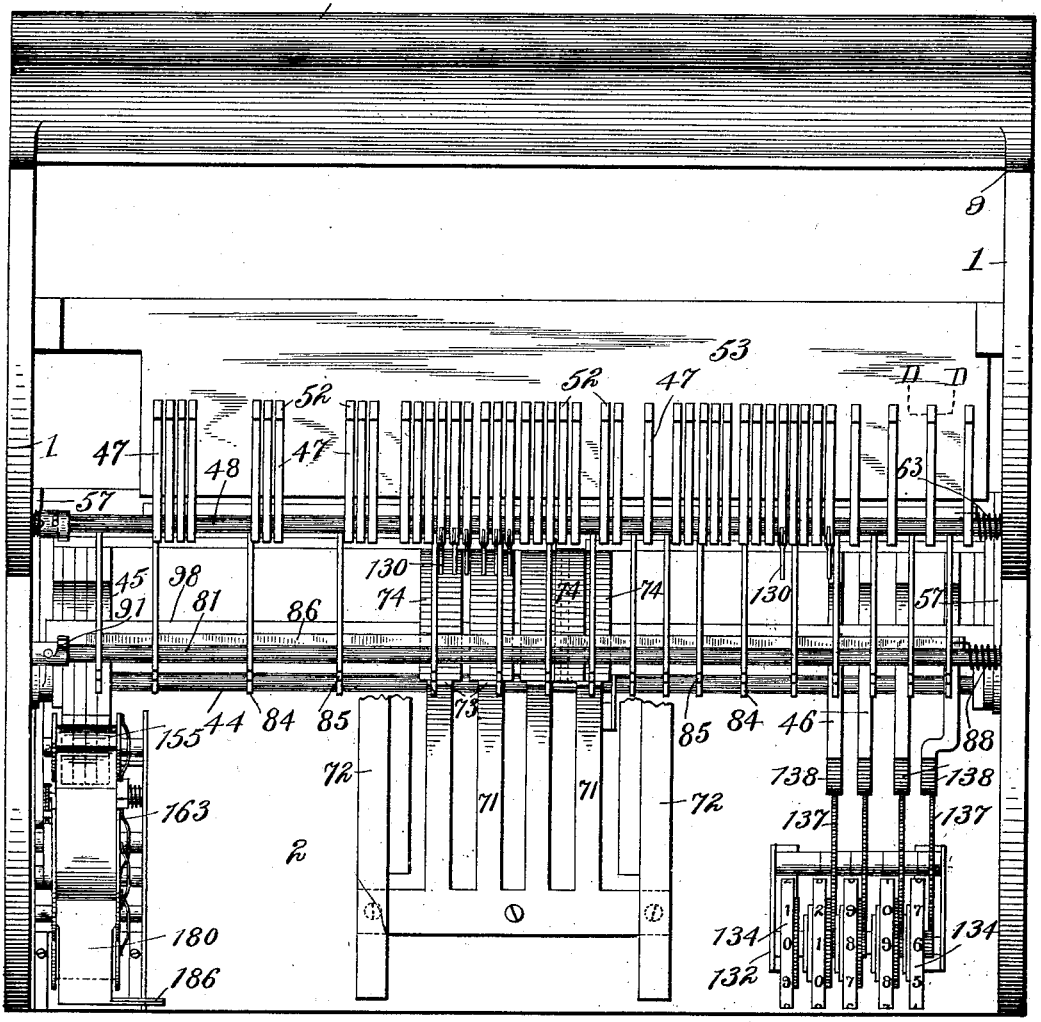
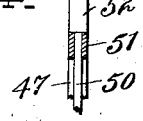

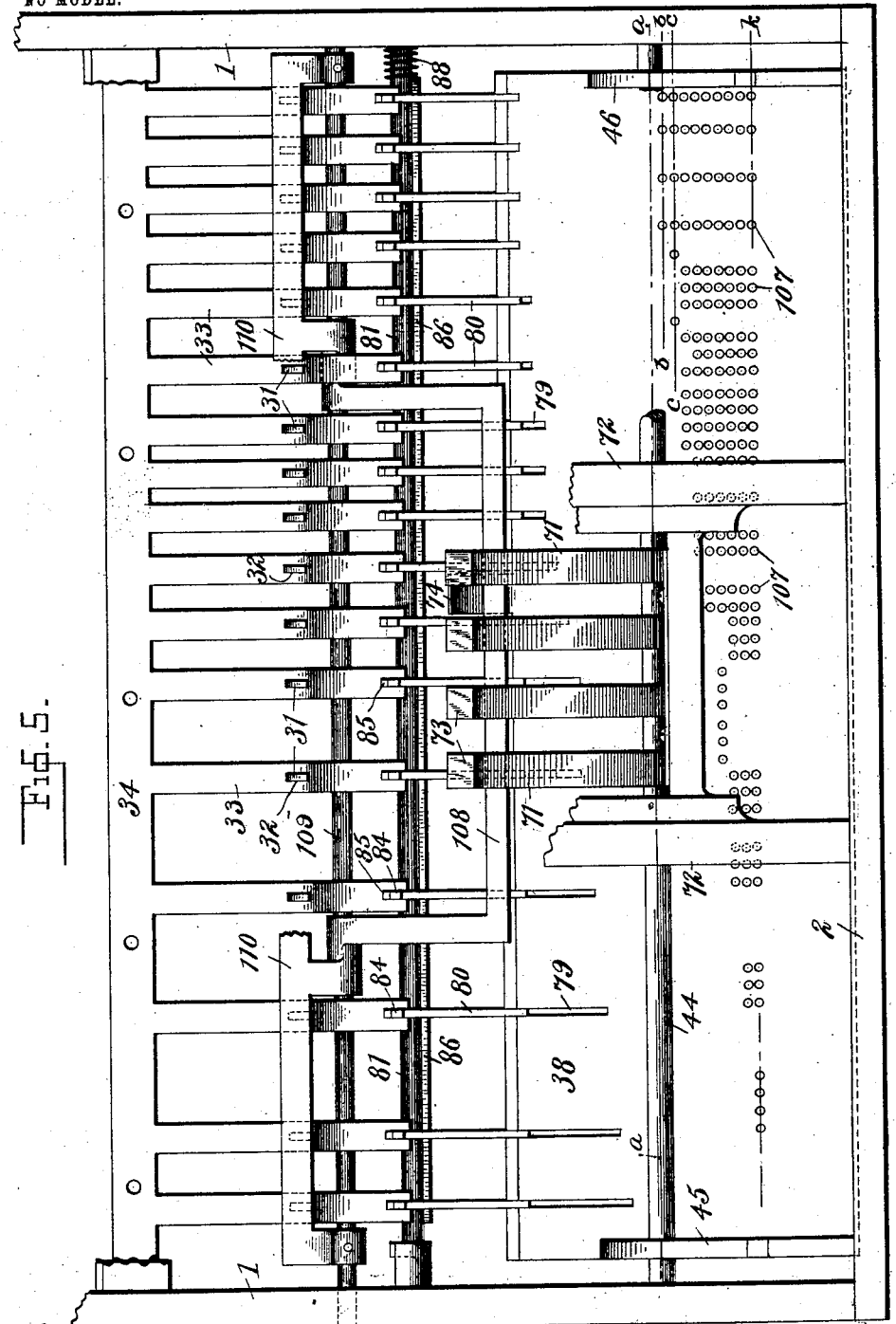

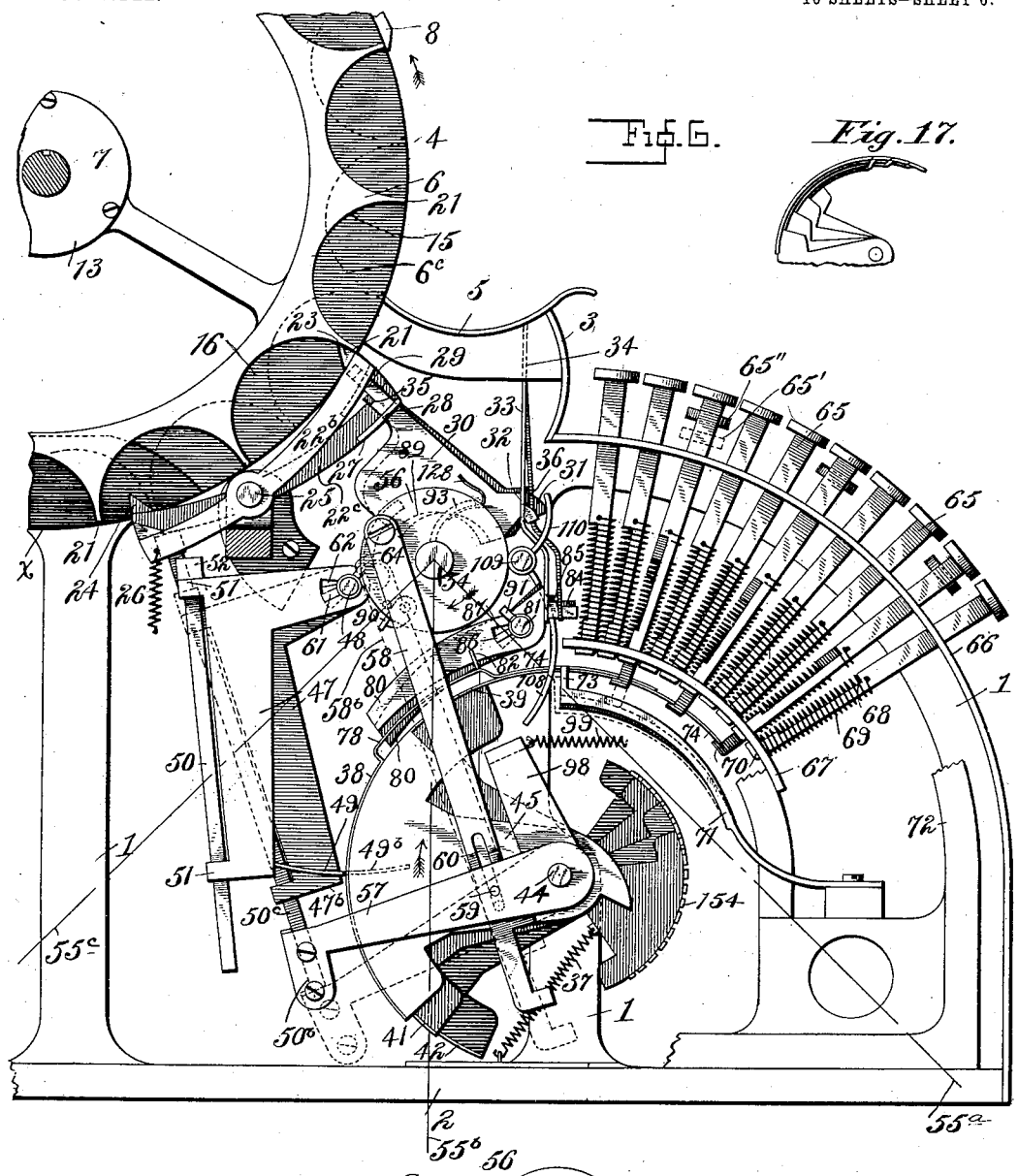

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 7.

Witnesses
Wm. A. Courtland
Wm. P. Hammond

Inventor,
Charles F. Bassett
by
Attys

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 8.

Witnesses. Inventor.
Wm A. Courtland Charles F. Bassett
Wm P. Hammond by
Knight Bros
Attys.

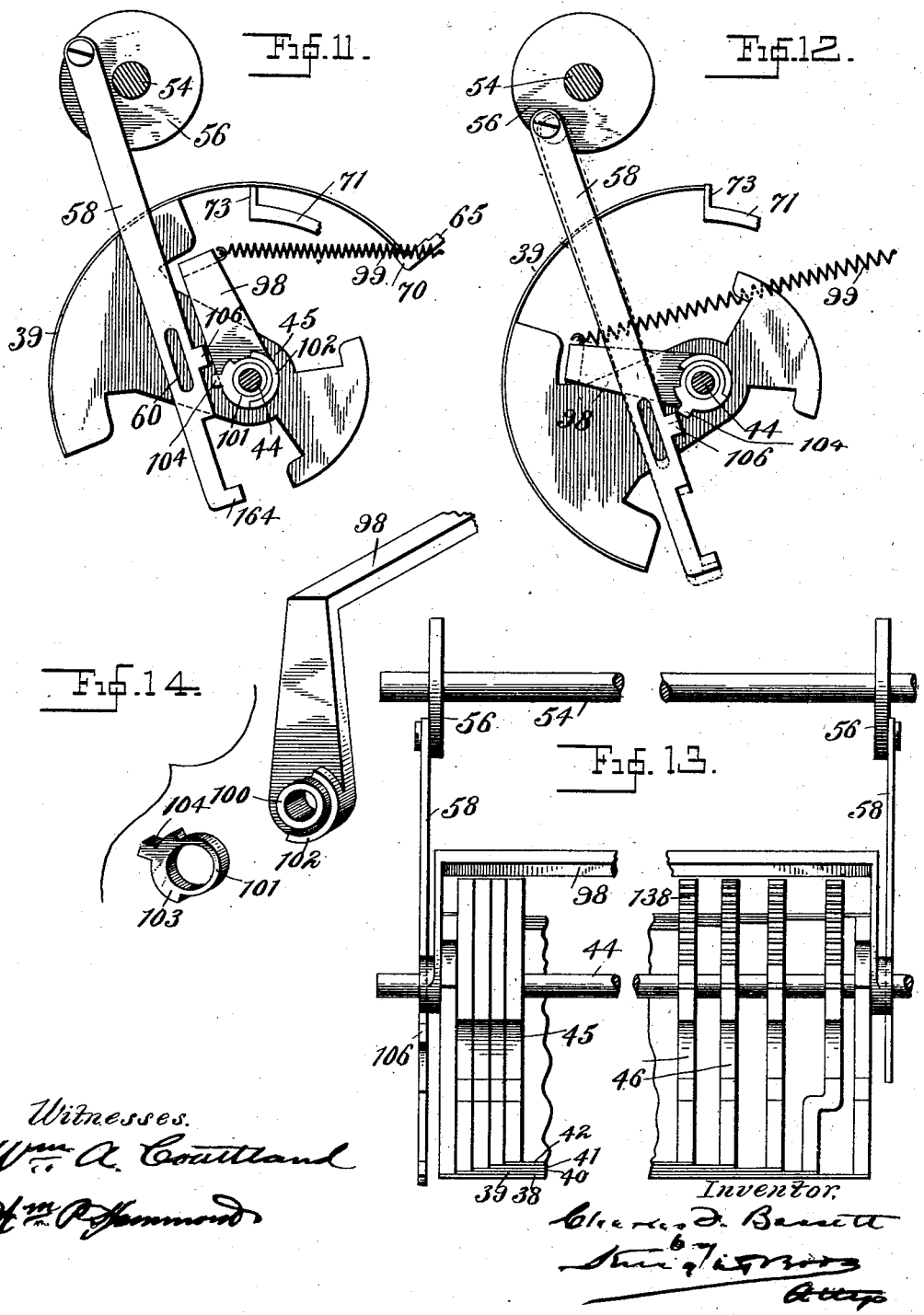

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 10.
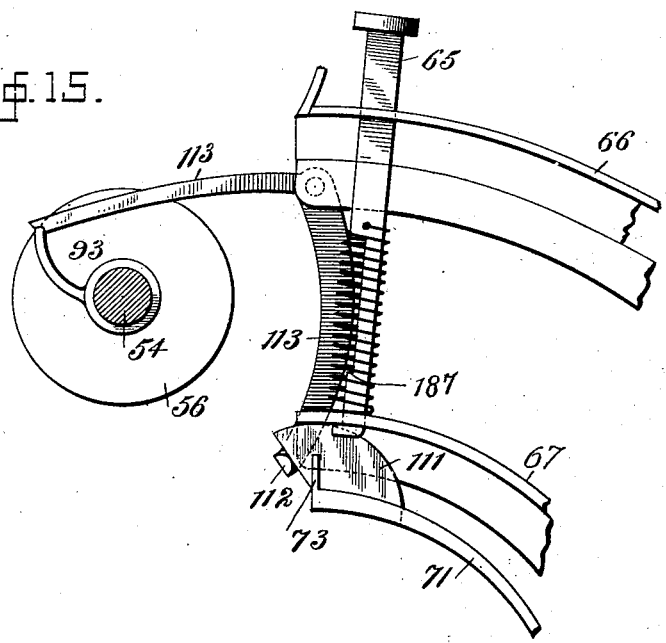
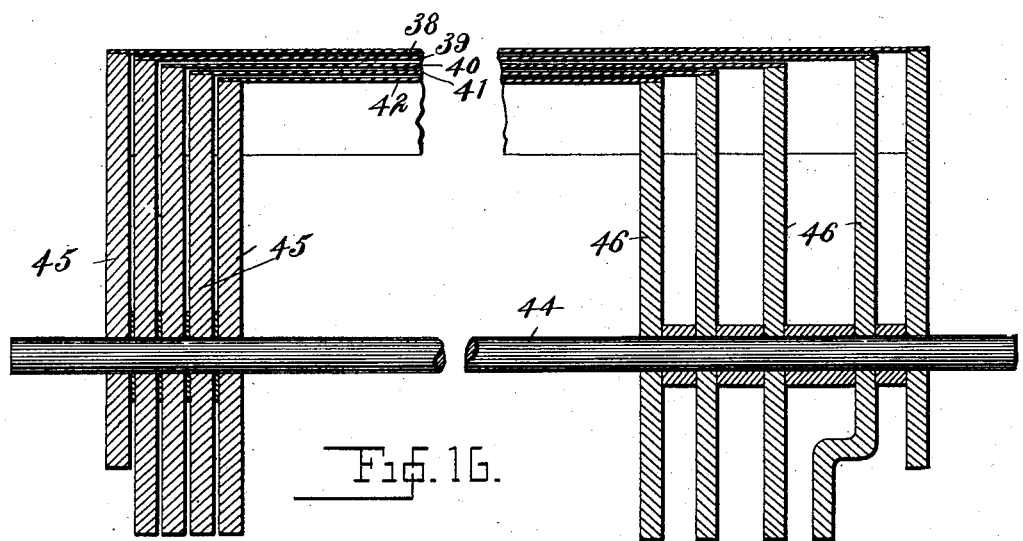

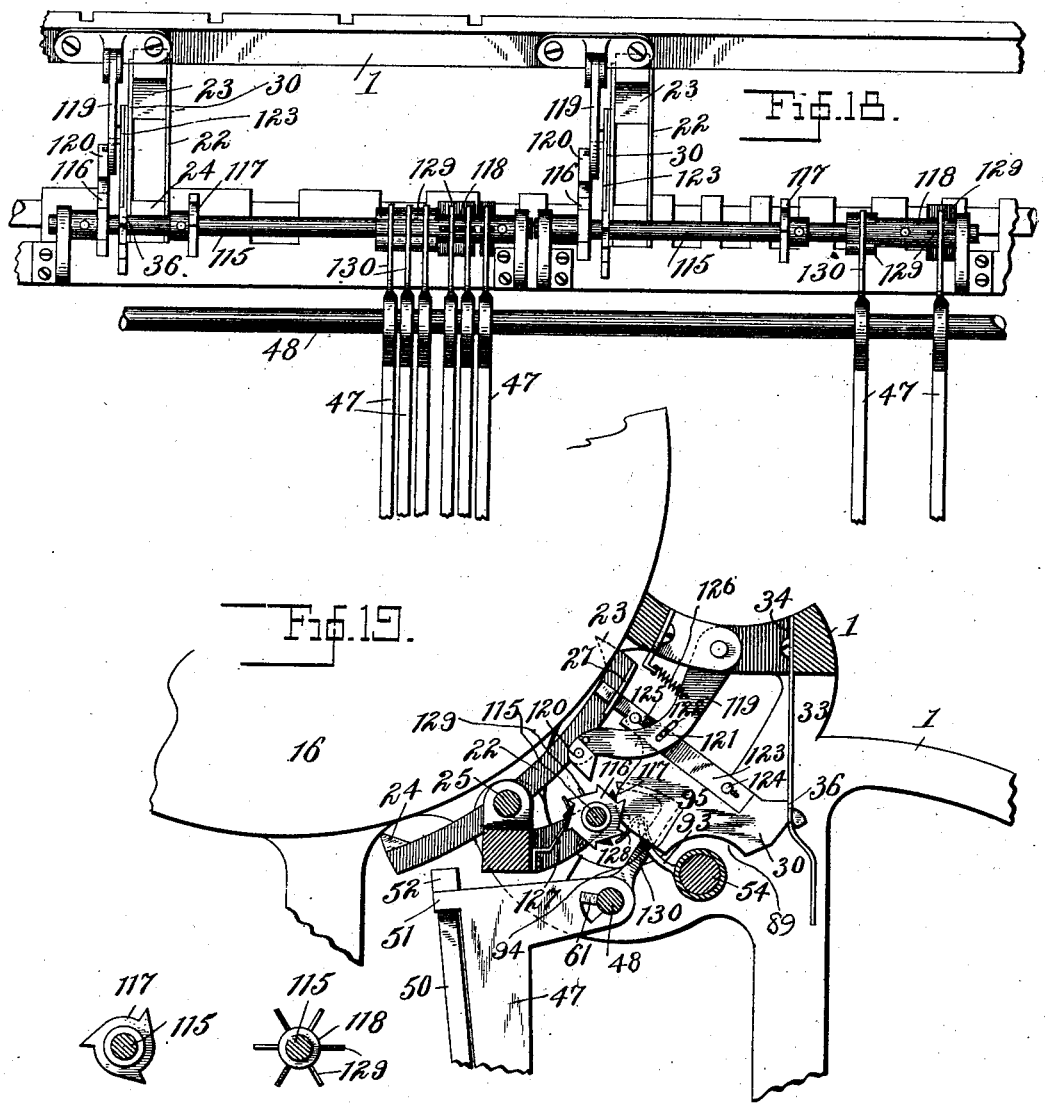

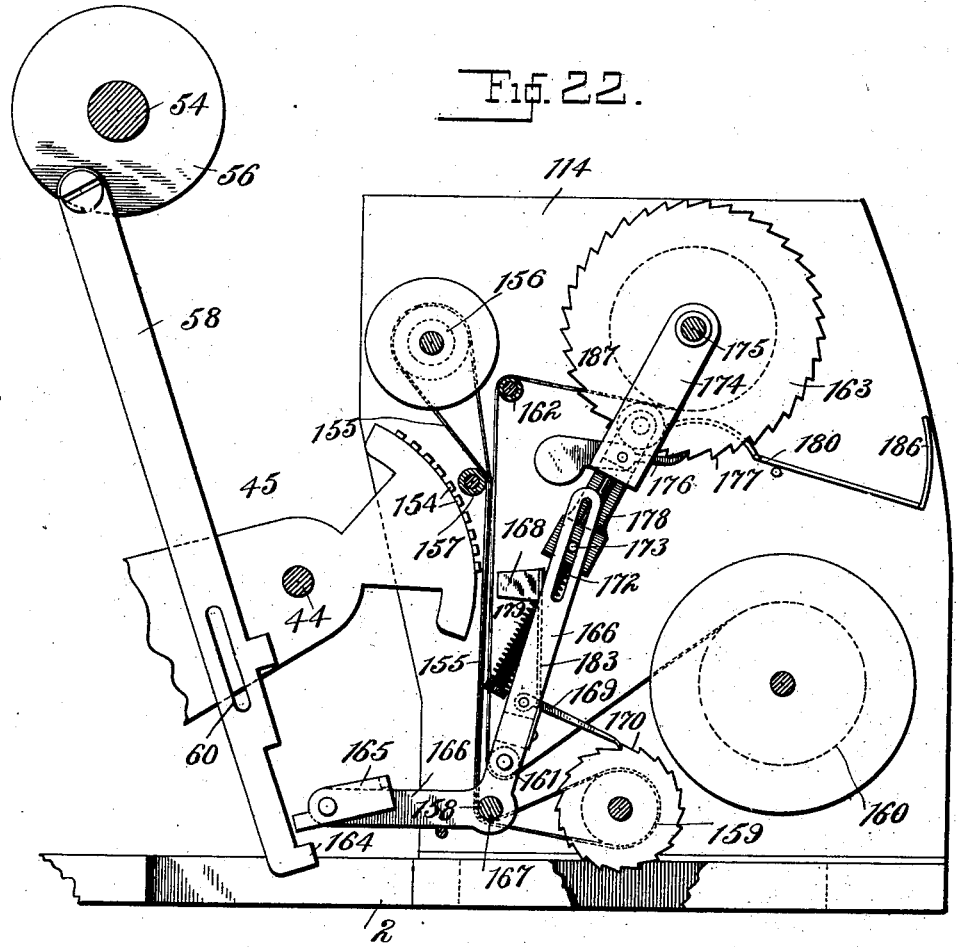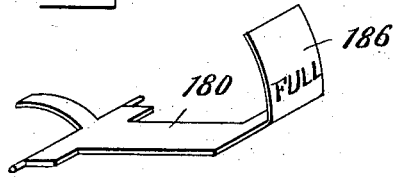

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 13.
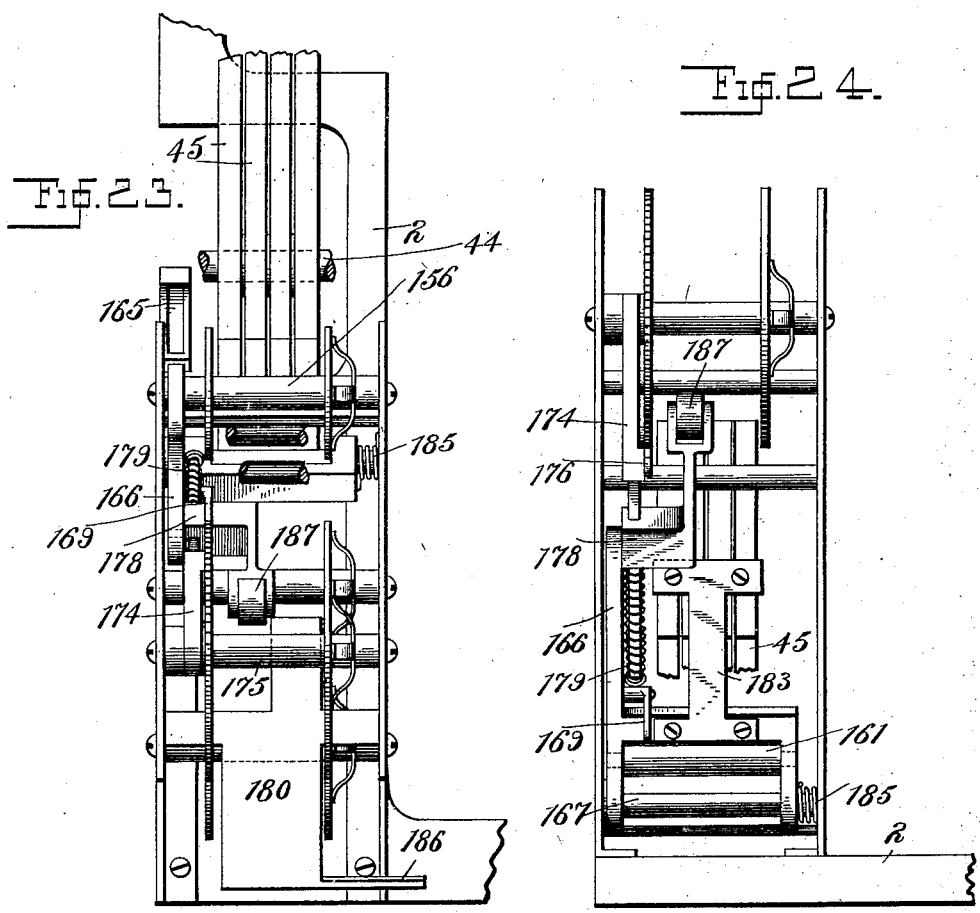
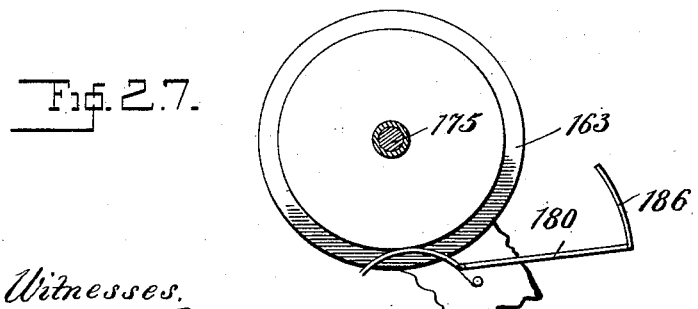

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 14.
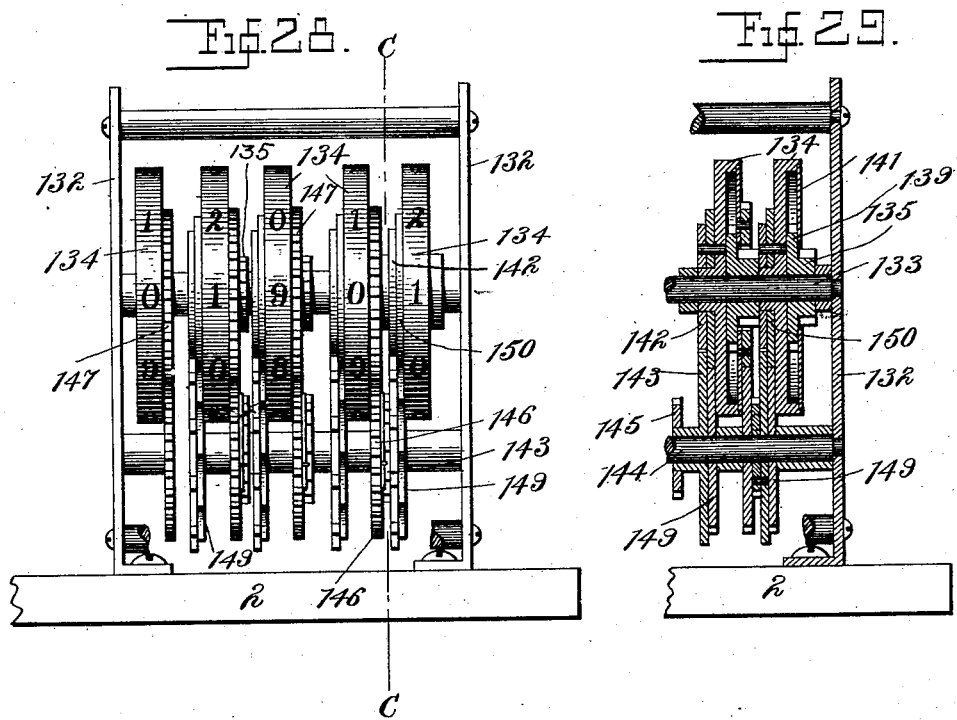
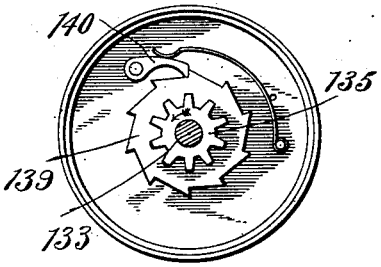
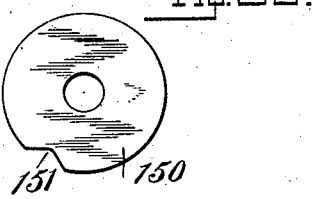
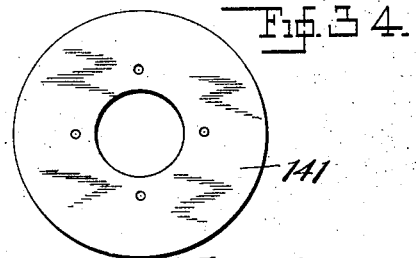
Witnesses.
Wm. A. Courtland
Wm. P. Hammond
Inventor
Charles F. Bassett
by
Knight Bros.
Attys.

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 15.
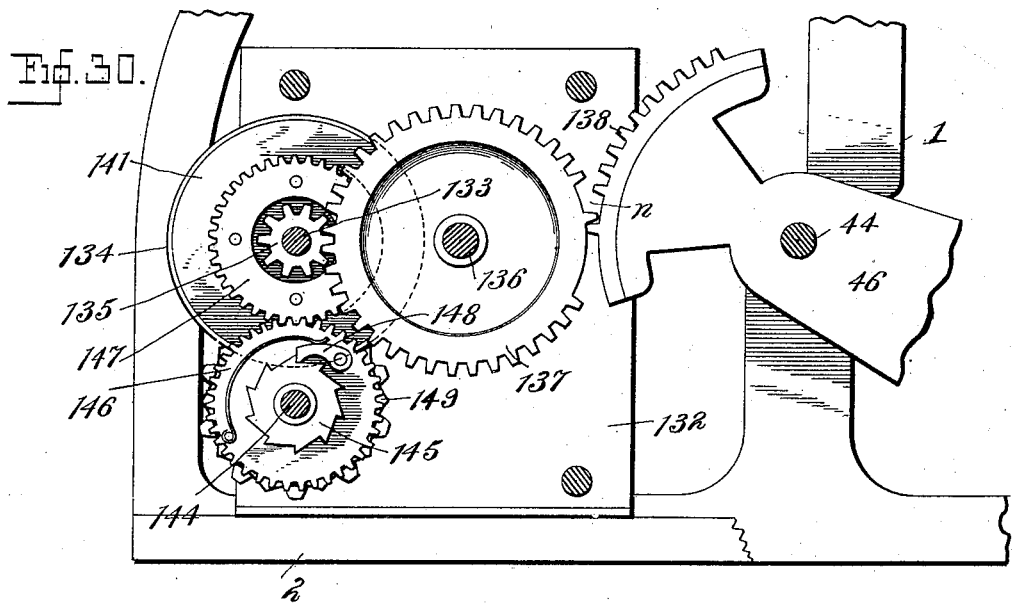
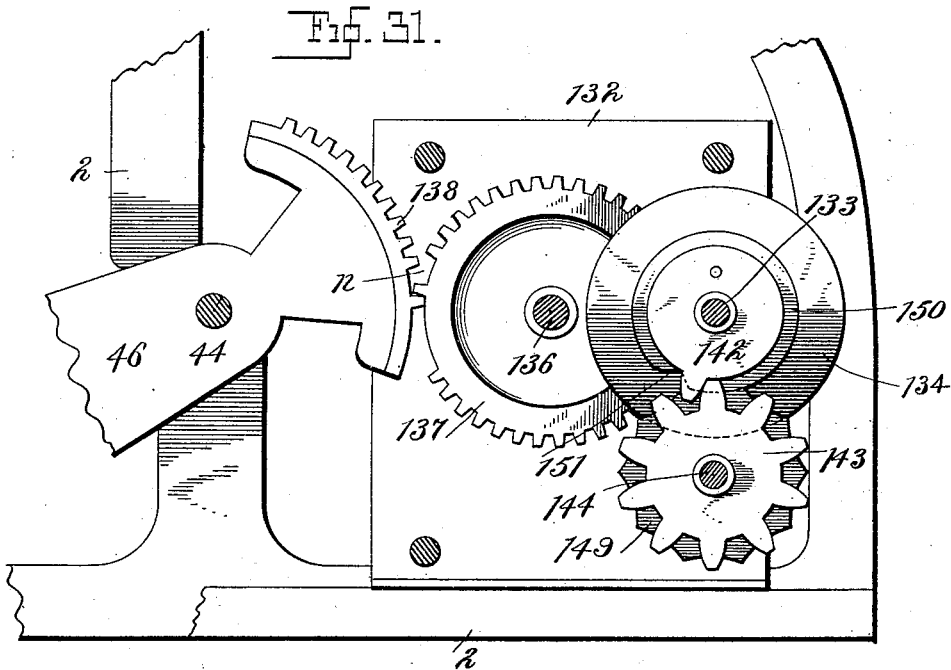
Witnesses, Inventor.

No. 720,552. PATENTED FEB. 17, 1903.
C. F. BASSETT.
MECHANICAL CASHIER.
APPLICATION FILED MAR. 29, 1901.
NO MODEL. 16 SHEETS—SHEET 16.

Witnesses.
Wm A. Courtland
Wm P. Hammond

Inventor.
Charles F. Bassett
by
Knight & Moss
Attys

THE NORRIS PETERS CO., PHOTO-LITHO., WASHINGTON, D. C.

UNITED STATES PATENT OFFICE.

CHARLES F. BASSETT, OF CHICAGO, ILLINOIS, ASSIGNOR, BY MESNE ASSIGNMENTS, TO AMERICAN MECHANICAL CASHIER COMPANY, A CORPORATION OF NEW JERSEY.

MECHANICAL CASHIER.

SPECIFICATION forming part of Letters Patent No. 720,552, dated February 17, 1903.

Application filed March 29, 1901. Serial No. 53,413. (No model.)

*To all whom it may concern:*

Be it known that I, CHARLES F. BASSETT, a citizen of the United States, residing at Chicago, in the county of Cook, State of Illinois, have invented certain new and useful Improvements in Mechanical Cashiers, of which the following is a specification.

This invention relates to improvements in mechanical cashiers; and its object is to provide a machine of simple construction adapted to issue change corresponding to amounts deposited therein and amounts of purchases made and also, if desired, register and record the purchases.

The machine comprises a plurality of cash-receptacles, each of which is adapted to be operated directly by the operator's hand in the act of depositing money therein to remove the money from accessible position, and controlling means controlled, on the one hand, by the movement of the cash-receptacles and, on the other hand, by the purchase-keyboard mechanism to determine and control the return movement of the cash-receptacles to deliver the proper change.

The machine also comprises a controlling mechanism connected or coöperating with the cash-receptacles or deposit devices and also with the purchase-keyboard devices and consisting of relatively shiftable plates or frames acting as stop devices for selecting means, so that the operation of said selecting means is controlled permutatively and conjointly by the several plates, the said selecting means being adapted to control the delivery of money in making change.

My invention further comprises other specific features of improvement, as hereinafter set forth.

Figure 2:
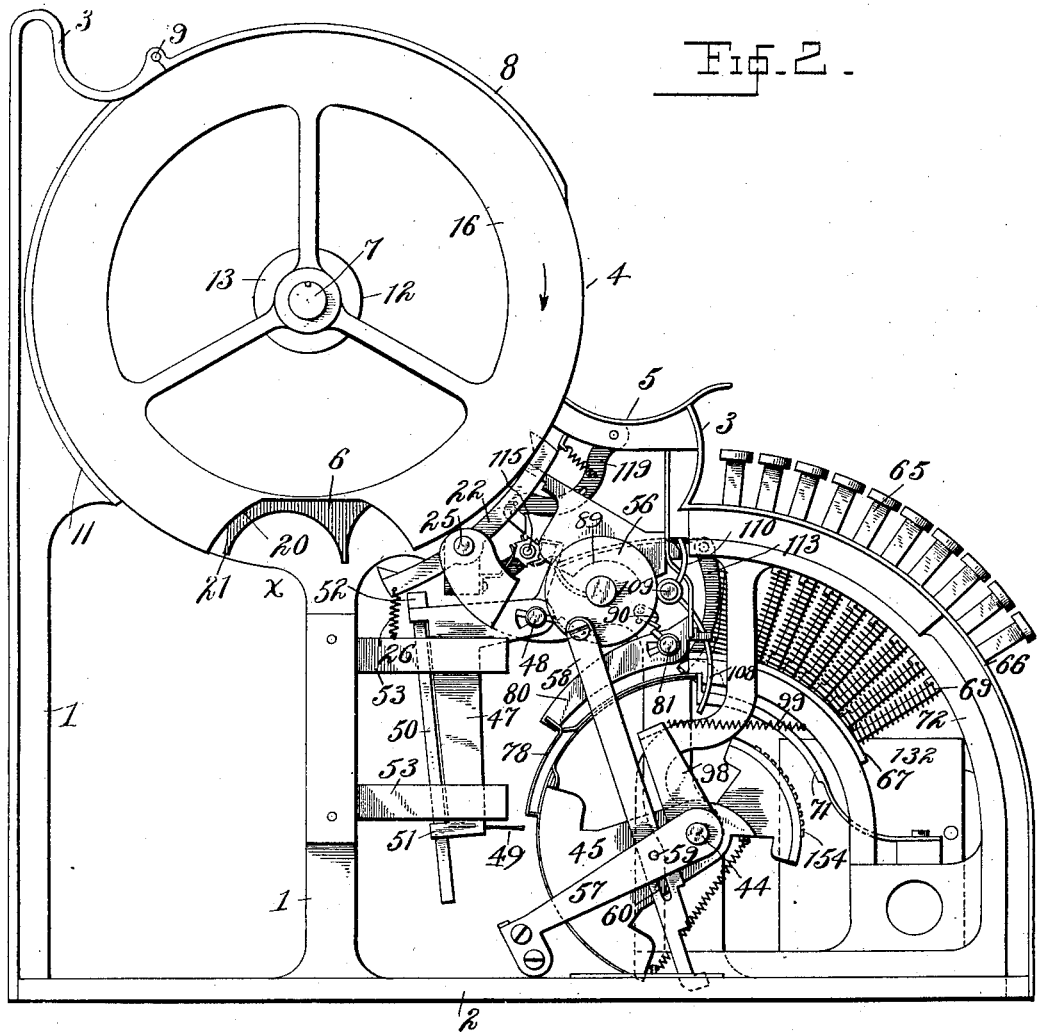
Figure 3:
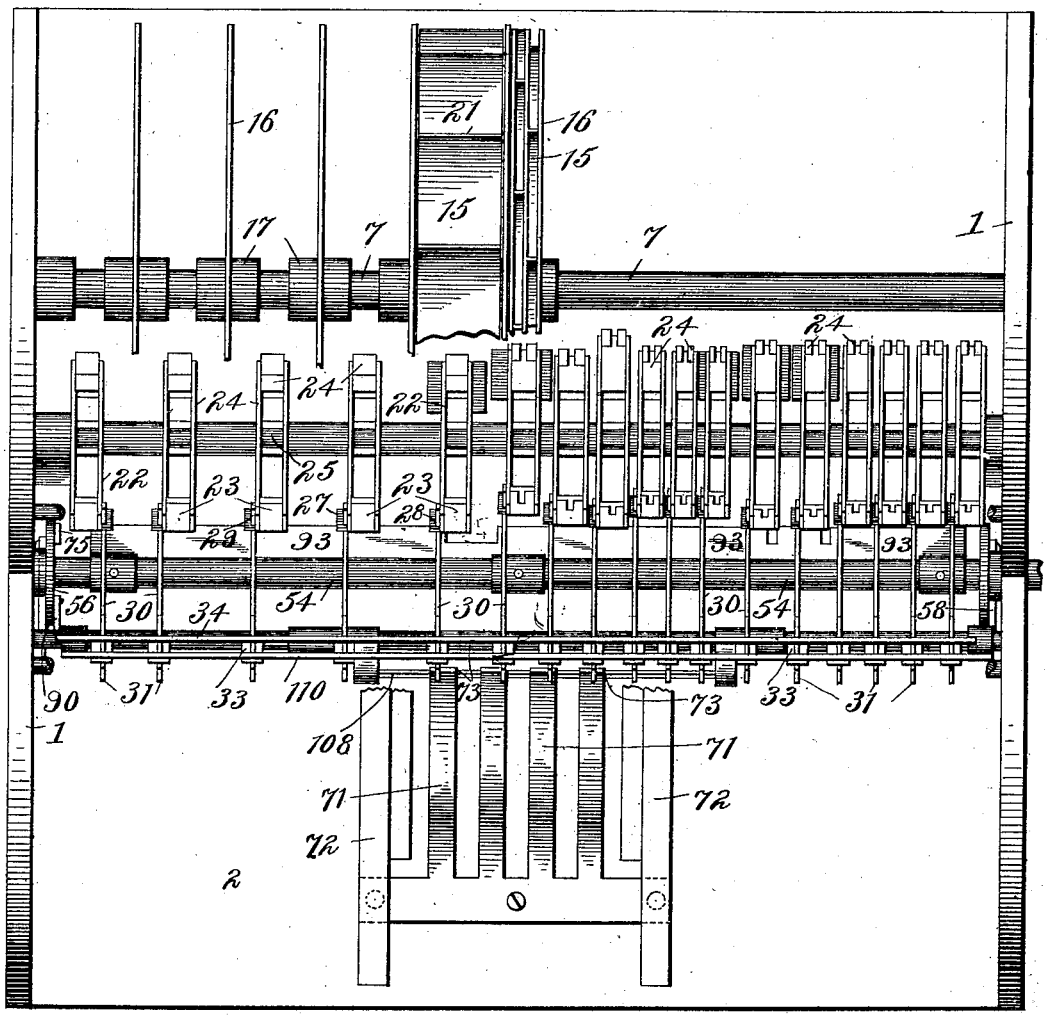
Figure 7:
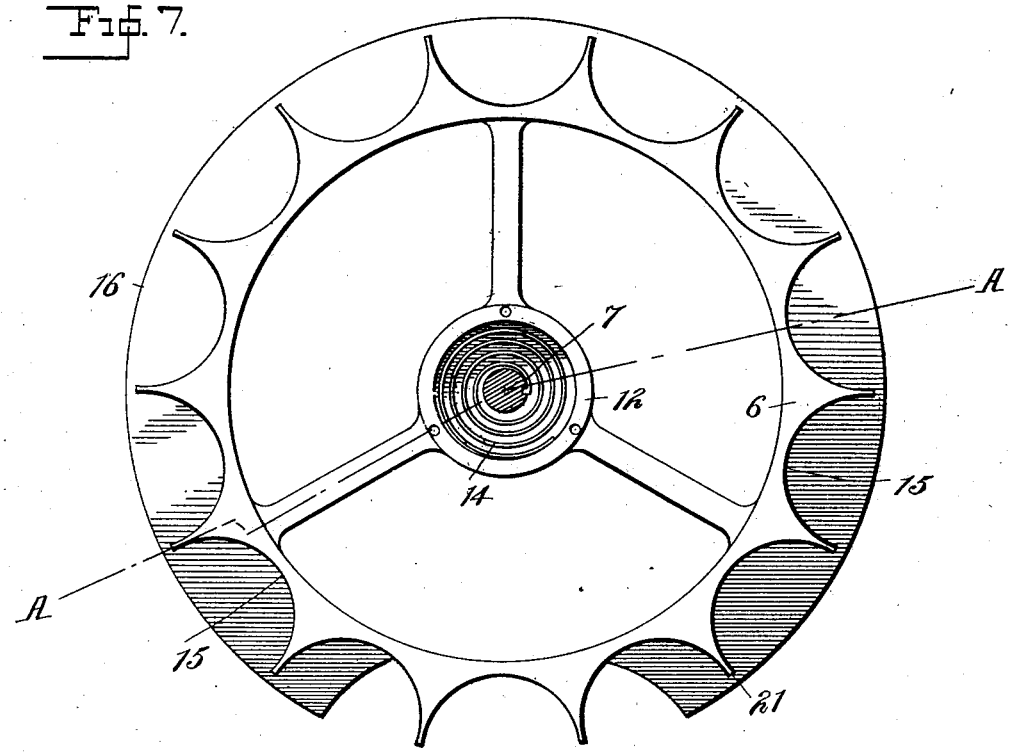
Figure 8:
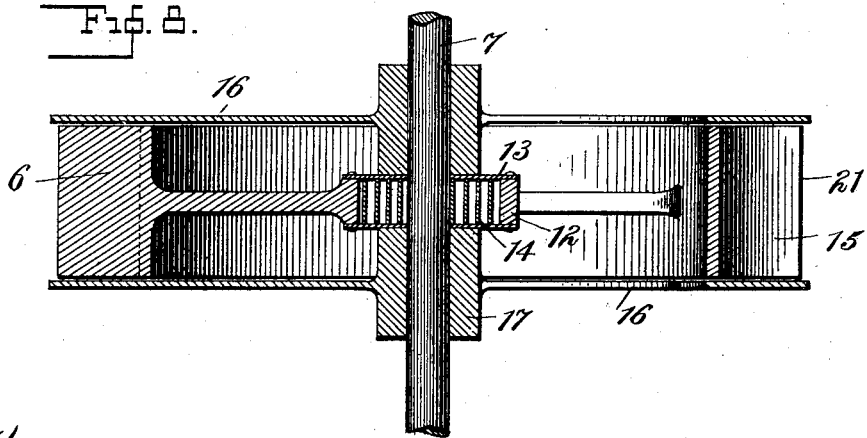
Figure 9:
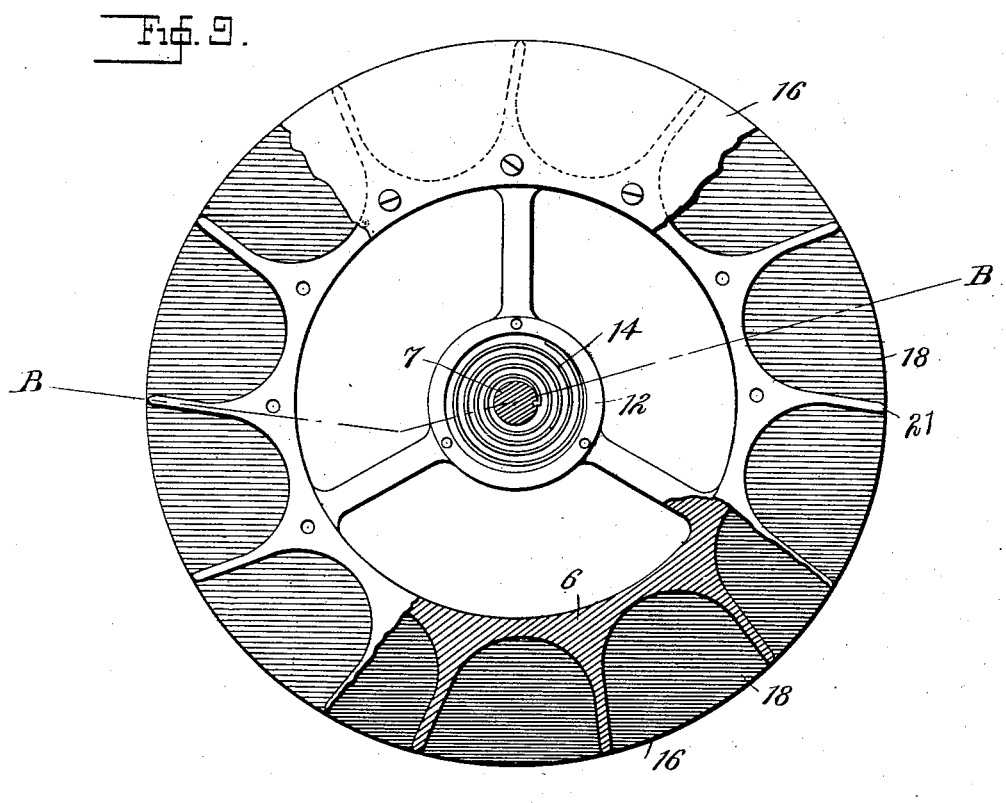
Figure 10:
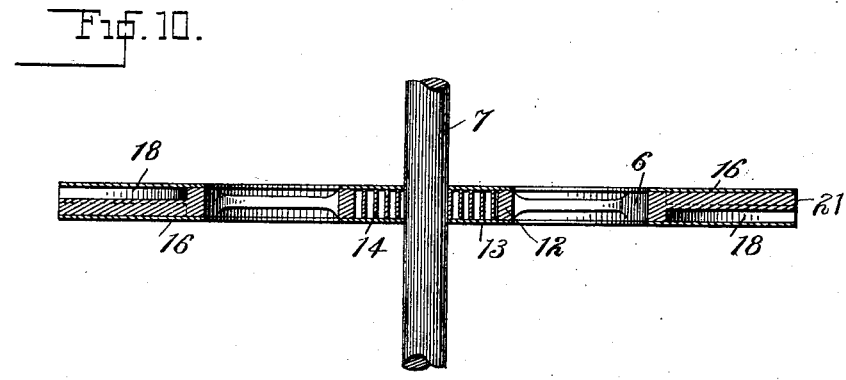
Figure 35:
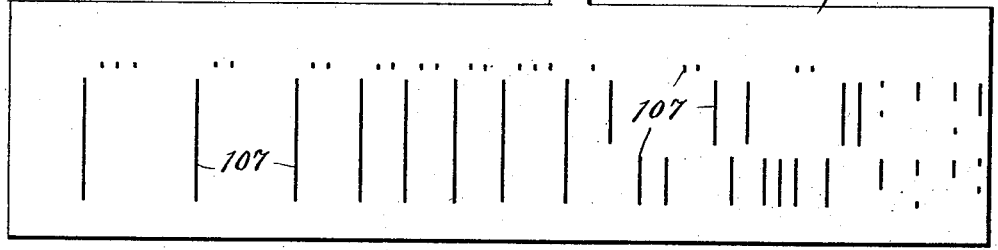
Figure 36:
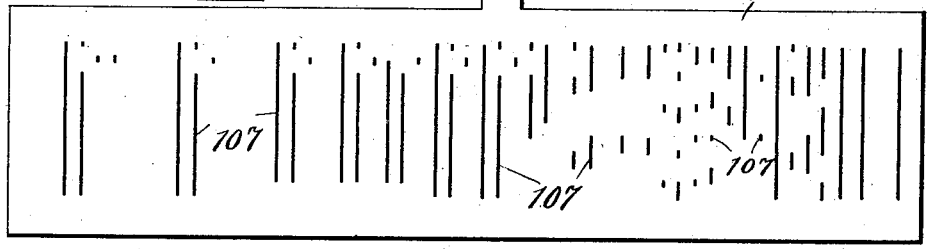
Figure 37:
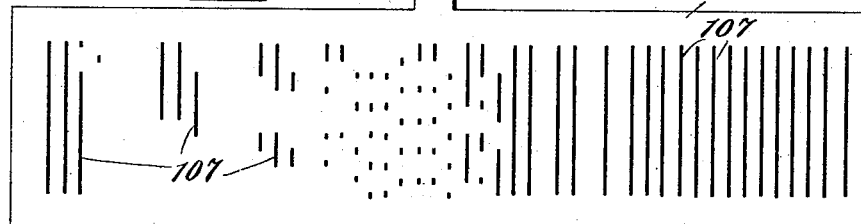
Figure 38:
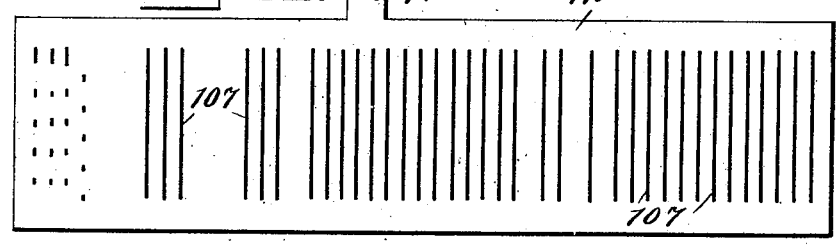

In the accompanying drawings, Figure 1 is a front elevation of a mechanical cashier embodying my invention. Fig. 2 is an end view of the mechanism of same with the end of the case and some other parts removed, showing the parts in normal position. Fig. 3 is a plan view of the mechanism with the top of the case and some other parts removed, showing the cash-receptacles and the detent or escapement mechanism therefor. Fig. 4 is a plan view with the cash-receptacles and escapement devices removed to show the parts below. Fig. 4ª is a detail section of one of the selecting devices on the line D D in Fig. 4. Fig. 5 is a front elevation of the deposit-segment and coöperating mechanism, the purchase-keyboard having been removed. Fig. 6 is an end view similar to Fig. 2, but on a larger scale and with parts of the frame and cash-receptacles omitted, the parts being shown in operated position. Fig. 6ª is a detail view of a cam for operating the selector-shaft. Fig. 7 is an end view of a bill-receptacle with the side plate removed. Fig. 8 is a section on the line A A in Fig. 7. Fig. 9 is an end view of a coin-receptacle broken away in two different planes to show the two sets of compartments therein. Fig. 10 is a section on the line B B in Fig. 9. Figs. 11 and 12 are end views of the resetting means for the permutating devices in two different positions. Fig. 13 is a front view of same, and Fig. 14 is a detail perspective view of part of the resetting means. Fig. 15 shows in end elevation means for locking the main operating-shaft until the purchase-keyboard is operated. Fig. 16 is a longitudinal section of the permutating devices. Fig. 17 is a side view of stops, projections, or tongues on the permutating devices. Figs. 18 and 19 are respectively plan and end views of "alternating mechanism" for the five-dollar and twenty-five-cent denominations, and Figs. 20 and 21 show details thereof. Fig. 22 is an end view of the recording mechanism; and Figs. 23 and 24 are respectively plan and front views of such mechanism, the paper and inking-ribbon being removed. Figs. 25, 26, and 27 show details of this mechanism. Fig. 28 is a front elevation of the registering mechanism, and Fig. 29 is a vertical axial section of a portion thereof. Figs. 30 and 31 are vertical sections on the line C C in Fig. 28 looking, respectively, toward the left and the right. Figs. 32 to 34 show details of the registering mechanism. Figs. 35 to 38 are diagrammatic plans of the permutating-plates.

The machine comprises the following principal mechanical elements: cash-receptacles for receiving and delivering the cash, escapement means governing the action of such receptacles in delivering cash, purchase-keyboard mechanism operated by the attendant in accordance with the purchases, permutating devices controlled by the cash-receptacles or deposit devices and by the purchase-keyboard conjointly, selecting means coöperating with permutating devices to control the escapement means, and main operating means for operating and resetting the various parts. The machine may also comprise registering and recording mechanisms.

The base 2 of the machine carries the frame or frames 1 for supporting the mechanism, and a casing 3 is provided, which substantially closes in the machine at all parts, except at the aperture 4, which extends in the form of a slot across the front of the machine to give access to the cash-receptacles and permit charging and discharging of same. Directly below this aperture 4 is the channel, trough, or shelf 5 to receive the money discharged from said receptacles.

The cash-receptacles 6 are mounted side by side on a shaft 7, fixed lengthwise in the frame 1, and are in the form of annular drums or wheels with pockets in their peripheries adapted to contain money. Said peripheries rotate close to the lid or top portion 8 of the casing, which is rounded to conform to the receptacles and which is hinged at 9, so as to be thrown open when desired for charging the machine, but is normally locked down, so as to prevent access to the money in any pocket which has passed beneath it, this lid, however, being preferably a glass panel 10, through which the money in the pockets may be inspected. A fixed segmental guide or retaining plate 11 surrounds the back part of the cash-wheels from the rear of lid 8 down to a space $x$, where the cash is to be discharged into the drawer or storage-receptacle.

The discharge of the money both at the front aperture 4 and at the inside discharge-point $x$ is altogether by gravity, the pockets in the cash-receptacles being formed so as to allow the money to drop out of a pocket when it has passed free of the retaining-plate 8 or 11. Each cash receptacle or wheel has a central hub or drum 12, with side plates 13, whereby the wheel is centered on the shaft and containing a spring 14, attached at one end to the shaft and bearing at its outer end with frictional contact against the inside of the drum. The cash-receptacles are differently formed, particularly as to their pockets, according to whether they are intended to contain bills or coin. Each bill-receptacle, as shown in Figs. 7 and 8, has a single circumferential row of wide pockets 15, large enough to accommodate one or more bills in each pocket. I prefer to make the side walls or partitions for these bill-receptacles in the form of stationary plates 16, fixed to the stationary shaft 7 and provided with collars or central hubs 17, through which the shaft 7 passes, these hubs serving also as lateral bearings for the hub or central drum of the cash-receptacle, so as to maintain the receptacle in proper position longitudinally on the shaft. These fixed plates 16 are a little larger than the cash-wheels 6, so as to prevent the casing or the lid from touching the latter, and are cut away below, as at 20, so as to expose or open one or both sides of the pocket at that point to insure the free dropping of the bill. The coin-receptacles, one of which is shown in Figs. 9 and 10, have pockets 18, preferably arranged flatwise and with a plurality of rows of pockets located side by side, the pockets of each row overlapping with or being arranged in a different angular position from those of the other row or rows. For example, if there are two rows of pockets they will be arranged in alternation. The side plates 16 for the coin-receptacles are fastened directly thereto. The walls between the coin-pockets of a circumferential row are not radial, but inclined to the radial direction, as shown, so as to enable the coin to run freely from the pocket by its own weight through the front aperture.

The springs 14 within the cash-receptacles exert a constant tendency to turn the receptacles backward in the direction of the arrow in Fig. 2. This tendency is normally resisted by an escapement or detent mechanism, which is controlled by the deposit and purchase devices to permit only such receptacles to turn backward as will conjointly deliver the proper change. The deposit devices—that is to say, the devices which are manipulated by the operator in accordance with the amount of the deposit made in the machine—are preferably the cash-wheels themselves, which are exposed in such manner at aperture 4 as to permit the operator in the act of depositing the cash therein to engage the wheel with his fingers and turn it in the direction of the arrow in Fig. 6, the escapement mechanism enabling free movement in this direction, and the spring 14 in such movement will be wound tighter, or if it is already sufficiently wound it will slip on the hub of the cash-wheel.

The escapement device for each cash-wheel consists of a lever 22, having two pallets or teeth 23 24, alternately engaging with projections or teeth 21 on the cash-receptacles, these teeth 21 being formed by the angles, walls, or projections between the circumferential row of pockets. The escapement or detent levers 22 are pivoted on a shaft 25, fixed in the frame 1, and are pulled by springs 26 to position shown in Fig. 2, wherein the forward pallets 23 will engage and stop the cash-receptacles against back movement. Near this end the escapement is provided with a lateral flange 27, slotted at 28 to receive the end or finger 29 of a link, called herein the "deposit-link," whose other end has a tail or hook 31 engaging in a slot 32 in a spring-plate 33, depending from a strip 34, that is attached to frame 1. Each deposit-link 30 has at one end a shoulder 35, adapted to engage the lower or rear end of slot 28 in the flange on the escapement-lever, and at its other end it has a shoulder 36, adapted to engage the corresponding spring 33. Link 30 rests normally by gravity in a position with its shoulder 35 bearing against or near flange 27, so that as the escapement-tooth 23 is depressed, due to rotation of the cash-receptacle projection 21 past or over it, the corresponding link 30 and the spring-tongue 33, engaged thereby, will be pushed forward. This operation sets certain dogging mechanism to determine the operation of the permutating mechanism according to the deposit device or cash-wheel operated. It also preferably unlocks the purchase-keyboard mechanism.

The permutating mechanism, which coöperates both with the escapement mechanism and with the purchase-keyboard, comprises a series or plurality of relatively shiftable vibrating frames or plates, herein shown as segment-plates 38 39 40 41 42. (See Figs. 6 and 16.) Plate 38 is controlled, through the escapement devices, from the cash-receptacles and is herein called the "deposit-segment." Segments 39, 40, 41, and 42 are controlled by the purchase-keyboard and will be herein termed the "purchase-segments." All these segments are arranged in concentric relation, being carried on arms or sections 45 and 46, mounted loose on the shaft 44, the several frames formed by the respective segments and their carrying-arms being nested or superimposed as shown. (See Figs. 13 and 16.) Springs 37 tend to turn the respective segments 38 39, &c., in the direction of the arrow in Fig. 6, their movements being controlled by certain stop devices hereinafter described. Instead of such springs being used the parts may be made to operate by gravity. The several segments 38 39, &c., are perforated with holes whose location determines the action of the segments as permutating devices.

Selecting means comprising selector-levers 47, pivoted on a shaft 48, are adapted to engage by needles, projections, or fingers 49 on said levers with the permutating plates or segments 38 39, &c., each of said selector-levers carrying a slide or bar 50, sliding in bearings or guides 51 on said lever and having at its upper end a head or enlargement 52, (see Fig. 4ª,) which under certain circumstances, as hereinafter explained, is adapted to engage under the rear end of the corresponding escapement-lever 22 and lift the pallet 24 at the rear end thereof, which depresses the forward pallet 23, thereby allowing the corresponding cash-receptacle to turn back to deliver change. This upward movement of the selector-slide 50 is effected by the main operating mechanism; but it is determined by the permutating-segments 38 39, &c., the holes in these segments allowing or opposing movement of the needles 49 and levers 47, which movement would cause the lower ends of slides 50 to swing forwardly into coöperative relation with bail or frame 57, forming a part of the main operating means. The selector-levers 47 are guided in comb-plates 53, secured in frame 1.

The main operating means comprises a main shaft 54, a handle 55 thereon, working between stops, disks 56 on said shaft, a bail or frame 57, mounted loose on the shaft 44, and links or pawl-rods 58, pivoted to the disks 56 and engaging with the bail or frame 57 by a pin-and-slot connection 59 60. The selector-levers 47 are normally held in the position shown in Fig. 2, with the needles 49 just free of the outermost segment 38, by a wing 61 on the shaft 48 engaging with the tops of slots or notches 62 in the selector-levers, a spring 63 acting on the shaft 48 to hold it in this position. One of the disks 56 on the main operating-shaft 54 has a lug or cam 75, so that when the disk is turned in the direction of the arrow in Fig. 6 it engages a lug 64 on the selector-shaft 48 to turn said shaft so that its wing 61 will descend, allowing the selector-levers to move under the influence of gravity and bringing their needles against the outer permutating-segment. Further movement of the needles will then be controlled by the position of the holes in the segments.

The purchase-keyboard comprises a frame 72 and a plurality of keys 65, arranged in rows or sets for units, tens, hundreds, &c., said keys being supported and guided in segmental plates 66 67, so as to slide in directions radial to the axis or shaft 44 of the permutating devices, said segmental frame-plates being cylindrical segments whose axis or center is the axis of said shaft. Shoulders 68 on these keys are engaged by springs 69, whose other ends bear on the inner plate 67, so as to press the keys outwardly. These springs are also fastened to the plate 67 in such manner as to draw the inner ends of the keys rearwardly, so that when the keys are depressed shoulders 187 thereon will engage with the plate 67. At their inner ends said keys have lugs or lips 70, adapted to engage the inner side of frame-plate to limit the outward movement of the keys. Below or radially within each row of keys 65 is a spring-plate 71, fastened at one end to the frame 72 and bent in the form of a segment extending below or adjacent to the inner ends of the keys. Each spring-plate 71 has at its free end a lip or tooth 73, and the respective permutating devices or segments 38 39, &c., have tongues 74, which, as shown in Fig. 17, project forwardly from the corresponding segments. The segments being of different radius, the tongues 74 are bent, as shown in Fig. 17, to bring their free ends into the same plane, so that all these tongues will rest normally against the upturned lips or teeth 73 of the stop-springs 71. When any key 65 is depressed, its inner end will strike the spring-plate 71 that corresponds to that row of keys and will move the lip 73 of said spring-plate out of engagement with the end of the tongue 74 of the corresponding permutating-segment 39 40, &c. It should be noted that the deposit-segment, as well as the purchase-segments, is retained by a yielding key-controlled detent of this nature, its tongue 74 being adapted to engage the lip 73 of the units stop-spring 71, so that operation of a units-key releases both the deposit-segment and the units purchase-segment. When any one of the purchase-segments is released in this manner, it is turned by its spring 37 until the forward end of its tongue 74 strikes the inner portion or shank of the operated key, this operation taking place so that such engagement with the key and consequent stopping of the segment will be effected before the operated key can return to normal position. As said key then moves outwardly when released by the operator its lug 70 will engage under the end of the tongue 74 that has struck the key and will thus hold the key down or in. To insure that the key will stay in until it is caught by this locking device, I provide the key with a shoulder 187, which when the key is pressed in engages with the plate 67 to hold the key in. When the segment-tongue 74 strikes the key, it will push the latter from engagement with the plate 67, but will engage with the lug 70 to keep the key from returning to normal position. Thus in Fig. 6 65 and 65' represent, respectively, the outer or normal position of the key and the inner or depressed position, while 65" represents the position to which the key springs back and in which it is stopped by the engagement of lug 70 with the tongue 74.

The deposit-segment is provided with special stopping means controlled by the deposit devices. A portion 78 of this segment forward of the rear portion containing the permutating-holes is elevated or of a larger radius than such rear portion and has a series of slots 79 formed therein corresponding to the number of deposit devices or cash-receptacles. Dogs 80, pivoted on a shaft 81, are arranged in line with these slots and are guided by lips 82 on the segment portion 78, so that when such dogs are allowed to fall they will enter said slots and lie in the path of movement of the rear end of the slot as the segment moves forward under the influence of its spring 37. An arm or lug 84 on each dog 80 is straddled by the notched lower end of a corresponding one of the spring-plates 33, which by such engagement normally holds the dog in elevated position free of the deposit-segment. When any spring 33 is pressed back by the operation of the corresponding cash-receptacle, escapement, and deposit-link said spring will pass off and back of a shoulder 85 on the dog, allowing the dog to fall into position to engage the deposit-segment. The shaft 81 is pivotally mounted in the frame and carries a wing 86, which traverses slots 87 in all the dogs, said slots being of sufficient width to enable the dog to have a limited angular movement relatively to the shaft. Said wing is normally at the bottom of the slots, being held in that position by a spring 88, so that the dogs can fall freely when released, as above described. A latch 90 on one of the disks 56 on the main operating-shaft 54 is adapted to pass freely over a lug 91 on shaft 81 in the first movement of shaft 54 in the direction of the arrow in Fig. 6; but in the return movement of shaft 54 said latch engages the lug 91 and raises the wing 86, so as to lift and reset the dogs, the springs 33 then snapping back into place. When latch 90 passes beyond lug 91, spring 88 returns wing 86 to normal position. The unlocking of the dogs through the escapement 22, deposit-link 30, and spring 33 takes place in the movement of the cash-receptacle by the operator's finger in depositing cash, such movement causing the wall or projection 21 between two of the cash-pockets to ride over or past the forward tooth 23 of the escapement, thereby rocking said escapement and operating the dogging devices, as stated. To insure against a repetition of this operation taking place in the subsequent rocking of the escapement due to the action of the main operating device acting through the selector-bar, especially in the case of the twenty-five-cent escapement, I arrange the link 30 with the releasable connection constituted by the slotted flange 27 with the link resting therein by gravity and with the shoulder 35 of said link adapted to engage the end of the slot, and I provide the main operating device with means for raising said link to disengage the shoulder from the flange, such means consisting of a wing 93 on main operating-shaft 54, having slots 94, in which the links 30 rest. This wing normally engages a portion 95 (see Fig. 19) of the links, so that when the shaft 54 turns in the direction of the arrow it will first raise the links to disengage them and will then ride into and under the curved portion 89 of the links, which curved portion at that time (see Fig. 6) will be concentric with the shaft, so that further movement of the shaft will not further displace the links. During such further movement of the shaft 54 the selector-bar is operated to rock the escapement 22 and allow the cash-wheel to be turned back by its spring. The disconnection of the escapement from the deposit-link has also other advantages. Thus it enables the selector-levers to rock the necessary escapements without opposition by the springs 33. The wing 93 also acts as a guide for the link-plates 30 and as stop-arm for the operating-shaft.

Resetting of the permutating devices is effected from the main operating-shaft 54 through one of the disks 56, link 58, and a bail or frame 98, extending past all the arms 45 46, carrying the segments 38 39, &c., and having a loose connection with said link.

(See Figs. 11 to 14.) Said bail is pivoted on the shaft 44 of the permutating devices and is normally drawn forward by a spring 99. On the hub 100 of said bail or frame is mounted a loose sleeve or collar 101, adapted to have a certain amount of free angular movement, which is limited by engagement of shoulders or flanges 102 103 on the hub and collar, said collar resting normally by gravity in the position shown in Fig. 11. An ear 104 on this collar is adapted to be engaged by a lug 106 on the link 58 as the latter ascends, the collar then turning on the hub and allowing the lug 106 to move past it without turning the bail 98, said collar then dropping back to the position shown in Fig. 11. Then as the link descends in the return movement of the operating-shaft the lug 106 will engage the top of ear 104 and turn the collar 101 backward, the hub 100 and bail 98 turning with it by contact of shoulders 102 103 and the bail gathering and resetting the permutating devices.

I have shown a lock for the purchase-keyboard controlled by the deposit devices and a lock for the main operating-shaft controlled by the purchase-keyboard.

The purchase-keyboard lock consists of a bail or frame 108, pivoted on a shaft 109 and normally extending under all the spring-plates or detents 71, so as to prevent depression of any of the detents. A wing 110 on this frame 108 extends in front of the tails or hooks 31 on the link-plates 30, and when any one of these link-plates is pushed forwardly by the operation of the corresponding cash-receptacles it will through this wing operate the frame 108 to withdraw it from beneath the detents 71, thus freeing the purchase-keyboard.

On the detent or spring plate 71 of the units-row there is a cam 111, Fig. 15, which when this spring-plate is depressed engages a lug 112 on a lever 113, whose other end normally extends in front of the wing 93 on the main operating-shaft 54, but which is withdrawn so as to unlock the said shaft when the units detent-plate 71 is depressed, as stated.

I will now describe more particularly the construction of the permutating devices, whereby they are adapted to control the operation of the selecting devices or selectors to determine the amount of change delivered.

The deposit-segment 38 (see Fig. 5) has, as above stated, slots 79, which coöperate with the dogs 80 to stop the segment when it has been released from normal position. These slots are of different lengths, so that the travel of the segment is different for each different denomination of cash-receptacles, being, for example, greatest with the highest denomination—say the twenty-dollar receptacle—and least with the one-cent receptacle. The deposit-segment has also the holes 107, arranged in groups, one group for each cash-receptacle. The mechanical and mathematical conditions of making change by the method used herein demand in the case of some of the receptacles a plurality of selectors coöperating with the permutating devices, since if a single selector be used and the permutating devices be arranged to operate said selector correctly under certain conditions of deposit and purchase then under other conditions of deposit and purchase it will be found that said selector is inoperative, so that additional selectors will be required to provide for such cases. Thus I have shown two selecting devices for the fifty-cent, twenty-five-cent, and one of the ten-cent receptacles, three for the five-dollar, two-dollar, and one of the ten-cent receptacles, four for the ten-dollar and for the five-cent receptacles, and six for each of the two-dollar receptacles. The one-cent receptacles have each a single selector, and the same is true of one of the dime-receptacles. The order of the receptacles counting from the lowest is as follows: four for one cent, two for the five cent, three for the dime, one for twenty-five cent, one for fifty cent, two for the dollar, (paper and silver,) and one each for the two, five, ten, and twenty dollar, as indicated on the lower edge of lid 8 in Fig. 1. The latter has no selector, as it never has to deliver cash in making change. The line marked $a\ a$ in Fig. 5 may be taken as the line along which the selector-needles are arranged, and the lines $b\ b$, $c\ c$, &c., indicate the part of the deposit-segment that will register with the line $a\ a$ when the segment has been stopped by the operation of successive receptacles. It may be noted that the last line $k\ k$, corresponding to stopping by the twenty-dollar receptacle for a twenty-dollar deposit, has holes for all denominations below twenty dollars, the next line for the ten-dollar deposit has holes only for denominations below ten dollars, and so on, each line being blank except for denominations below its own value, so as to "cancel" the corresponding receptacle and all higher ones.

As to the further arrangement of the holes 107 it is only necessary to say that it is such that in any portion of the deposit-segment corresponding to the operation of a certain cash-receptacle holes will be presented to all the needles that may possibly be required in making change from a deposit of that denomination. When, therefore, the selector devices are released, such needles will pass through the deposit-segment; but their further movement will depend on the position of the purchase-segments 39 40, &c., as controlled by the purchase-keyboard. The arrangements of the holes 107 in the latter are indicated diagrammatically in Figs. 35 to 38, representing, respectively, the units, tens, hundreds, and thousands. It will be noted that when any key is depressed it will release the corresponding segment and stop it after it has traveled a certain angular distance, depending on which key in the row has been pressed. The zero-keys for all denominations above units will allow the corresponding segments to travel to bring the second line of holes into registering relation with the selector-needles, and operation of any of the keys above zero will allow the segment corresponding to that denomination to turn sufficiently to bring a line of holes corresponding to the operated key into coöperative relation with the needle-bars, and the arrangement of these holes is such that a free passage will be provided through all of the segments for those selector-needles which correspond to the proper change for the conditions of deposit and purchase as determined by the operated receptacles and keys.

In mechanical cashiers acting by cancellation, as in the present case, it is with some kinds of currency necessary to provide what may be termed "alternating" means to change the operation of some of the selecting means under certain conditions. Thus with the United States currency such special means must be provided for the five-dollar and for the twenty-five-cent deposit devices. The general operation of change-making devices depends on the assumption that each denomination is a multiple of all those below it, and in case of any departure from this relation, as for the five-dollar and two-dollar denominations, it is necessary to provide alternating means, as stated. The mechanism is normally set for correct operation with one dollar, two dollars, &c., it being assumed that high denominations will be multiples of two dollars, and if they are operated at the same time as the two-dollar controller it will not affect the change-making operation; but in case the five-dollar controller is also operated once or any odd number of times it introduces one odd dollar into the change-making operation, and the operation of the dollar-selectors must therefore be modified. The same principle applies to the twenty-five-cent, ten-cent, and five-cent denominations. In Fig. 2 the location of such means is shown, and Figs. 18 to 21 show the construction of same more clearly. Adjacent to the escapement mechanism are arranged shafts 115, on which are mounted to rotate two sets of rotatable devices respectively adjacent to the five-dollar and to the twenty-five-cent escapement, each set comprising a six-toothed ratchet-wheel 116, a three-toothed ratchet-wheel 117, and a six-winged collar 118, all these devices of each set being secured or formed to rotate together. A pawl-lever 119, pivoted to a part of the frame of the machine, carries a pivoted gravity-pawl 120, adapted to engage the six-toothed ratchet-wheel, and said pawl-lever is connected by a pin-and-slot connection 121 122 with a slide 123, carried by the corresponding deposit link-plate, but adapted to slide thereon, being guided by pins 124 on the link-plate engaging in slots 125 in the slides 123. Spring 126 draws the lever 119 normally to the position shown in Fig. 19. The rear end of slide 123 traverses the slot 28 in the flange 27 on the corresponding escapement-lever 22 and has the shoulder 35 to engage said flange when the link-plate and slide are in normal position, so that operation of the escapement will cause movement of lever 119 and through the pawl 120 will operate the ratchet-wheel 116 one tooth. In the return movement of the escapement the slide 123 will follow it up and the lever 119 will return to normal position, its pawl slipping over the tooth of ratchet-wheel 116. The link-plate 30 will, however, stay in operated position by reason of the engagement of spring-plate 33 with the catch or shoulder 85 on the dog 80. A snap-spring 127 engages ratchet-wheel 116 to hold same in definite angular position. On the shaft 54 are mounted spring-pawls 128, adapted to engage the three-toothed ratchet-wheels 117. The wings 129 on the collar 118 extend in coöperative relation with arms 130, extending from certain of the selector-levers. Thus in the case of the five-dollar alternating device there are two sets of three wings each alternately arranged and engaging, respectively, with arms of two different sets of three each of one-dollar selector-levers, while for the twenty-five-cent receptacle there are two alternately-arranged sets of wings engaging, respectively, with two five-cent selector-levers. In the normal position (shown in Fig. 19) one arm or set of arms 130 extends adjacent to one of the wings 129 on the corresponding alternating device, while the other arm or set of arms is free of the corresponding wings; but when the alternating device is advanced one-sixth revolution the condition of operative relation of each arm or set of arms for the corresponding alternating device is reversed, the wing of one set passing free and one of the other set coming adjacent to the tip of the corresponding arm 130. When a wing 129 is so placed near the tip of the arm of a selector-lever, it will prevent falling of the selector-lever when the latter is released by the main operating device, and such selector-lever will thereby be rendered inoperative. Such movement of the alternating device is effected through the corresponding pawl-lever 119 on the operation of the cash-receptacle, so that if one five-dollar bill, for example, be deposited and the five-dollar cash-receptacle turned a step the corresponding alternator will be advanced and will render inoperative the set of selectors that is normally in condition for operation and will bring the other set into operative relation. If two such deposits are made in succession, then the alternator will be turned the space of two teeth and the relative position of the wings will be the normal one, as it is only when an odd number of such deposits is made that the abnormal operation of the selectors is necessary. If an alternator has been operated one tooth, then on operation of the main operating-shaft the spring-pawls 128 engage with the three-toothed ratchet-wheel 117 to advance the alternator a further step, and thus restore it to normal condition. If the alternator has not been operated, then the operation of the spring-pawl 128 is without effect on the three-toothed wheel.

Mechanisms for registering and recording the purchases are provided and are preferably operated in connection with the purchase-segments 39 40, &c. The arms or sectors 45 46 at the ends of the vibrating segments, which support the segments on the shaft, are extended on the other side of the shaft to form at one end of the machine means for operating the registering devices, and at the other end of the machine means for bringing numeral-type into position for printing.

The registering mechanism (see Fig. 4 and Figs. 28 to 34) comprises a frame 132, fixed to the base of the machine, a register-shaft 133, fixed in said frame and carrying loose thereon the registering-wheels 134 and pinions 135, and a shaft 136, having gears 137 loose thereon and engaging, on the one hand, with the pinions 135 and, on the other hand, with segment racks or gears 138, formed on the aforesaid arms or sectors 46 for the purchase-segments. Attached to or formed with the pinions 135 are ratchet-wheels 139, that are engaged by pawl 140, carried by the register-wheels. The register-wheels are hollow and closed at one end by disks 141, which confine the ratchet-wheels 139 in place. It will be noted that a blank or gap is left at $n$ in both gears 137 and 138, so that the sectors and purchase-segments can turn one tooth without operating the register. This provides for operation of the purchase-segments on pushing the zero purchase-keys without affecting the register. Further operation of a purchase-segment, due to operation of digit-keys 1 2, &c., will cause rotation of the corresponding gear 137, pinion 135, ratchet-wheel 139, and through the pawl 140 of the corresponding register-wheel to an extent dependent on the key operated. For carrying from each register-wheel to that of the next higher denomination I provide single-toothed wheels 142 on the register-wheels, engaging with gears 143, mounted on a shaft 144, ratchet-wheels 145, attached to gears 143, and gear-wheels 146, carrying pawls 148, engaging with said ratchet-wheels, said gear-wheels 146 engaging with gears 147, attached to the next higher register-wheel, so that as each register-wheel passes the zero point it will turn the next higher wheel one tooth. To prevent accidental displacement, each carrying-wheel 143 has attached thereto a plate 149, having concave faces coöperating with the periphery of a disk 150 on the register-wheel to lock the parts except when a carrying operation is to be effected, at which time a notch 151 in disk 150 comes opposite the locking-plate 149 and allows the latter to turn. The indications of the register are observable through a sight-opening 153 in the front of the case. While the register-wheels are herein shown as operated by the springs of the permutative devices, other means for operating same may be employed provided that the movement is dependent on that of the permutating segments or keys depressed.

The recording mechanism (shown in Fig. 4 and Figs. 22 to 27) comprises a frame 114, carrying the ribbon, paper, and platen mechanism, and also comprises the type 154, formed on the extension of the sectors 45 at the other end of the machine from the register, these type being the numerals "0" "1" "2," &c., which are brought to the printing-point when the corresponding key has been operated. An inking-ribbon, preferably an endless ribbon, travels around rollers 156 157 158 159, both sides of the ribbon passing between the type and the paper. The paper is supplied from a roll 160 and passes over rollers 161 162 to a winding-drum 163. The platen device and the ribbon and paper feed devices are all operated from the main operating means above described, the link 58 of said operating means engaging by a lip 164 at its lower end with a latch 165 on a lever 166, pivoted on a shaft 167 and carrying the platen or hammer 168, the ribbon-feed pawl 169 engaging with a ratchet-wheel 170 on one of the ribbon-rolls and said lever engaging by slot 172 with a pin 173, connected with an arm 174, pivoted on the shaft 175 of the paper-winding drum and carrying a pawl 176, engaging with a ratchet 177 on said drum. The connection between pin 173 and arm 174 is made extensible, said pin being on a bar 178, sliding in said arm and carrying a roller 187, bearing on the paper on the winding-drum, so that as the drum fills with paper the position of pin 173 is shifted to decrease the angular travel of arm 174 as the paper-drum fills up, and thus maintain a constant length of feed. Spring 179, bearing on bar 178, presses the roller against the paper. A lever 180, pivoted to frame 114, bears at one end on the paper on the winding-drum when the drum is nearly full and carries at its other end a tablet 186, which shows through an opening 181 in the front of the casing when the drum is full, and thereby displays a notification to that effect. The roll of paper may then be renewed and a new one inserted. Inking-ribbon 155 may be continually inked by a pad 182 on roll 156, containing inking fluid. The hammer or platen 168 is carried by a spring-arm 183 on lever 166 and is adapted to strike the paper against the ribbon and the latter against the type by a sharp whip-like blow. When the operating-link is ascending, the lip 164 thereon engages with the gravity latch or pawl 165 and turns the lever 166, so as to move the hammer 168 away from the paper and at the same time feed the ink-ribbon and the paper. When the lip 164 passes off the latch 165, a spring 185 throws the lever 166 back to normal position, and the hammer 168 by reason of its elastic support delivers a sharp blow and makes the impression. In the descent of link 58 during the return movement of the operating-handle the lip 164 slips past the latch 165, which yields to allow such movement.

The operation of the mechanism is as follows: The attendant or operator places each piece of money received in the proper receptacle and by direct contact of his fingers with the receptacle pushes the same forward one step in the direction of the arrow in Fig. 6. This movement of the receptacle operates the corresponding escapement 22, link-plate 30, and spring-plate 33, allowing the corresponding dog 80 to fall into the path of the deposit-segment 38. The locking device 108 will also be operated by this movement to unlock the purchase-keyboard. The operator then pushes in the purchase-keys 65 corresponding to the purchase, and such movement of any key first through the spring-plate 71 of that row of keys releases the purchase-segment for that denomination and then stops the same segment in position corresponding to the key pressed. The attendant will of course press the keys for higher denominations first and the units-key last. Operation of the units-key in addition to controlling its corresponding permutating-segment 39 will release the deposit-segment 38 and also through cam 111 and lever 113 unlock the operating-shaft 54. The deposit-segment will turn until it is stopped by that one of the dogs 80 released by the cash-receptacle which will first engage it. These movements of the deposit and purchase segments are so controlled by the dogs 80 and the purchase-keys 65 that a series of the holes or perforations through all of said segments is presented opposite the needles 49 of selectors corresponding to the cash-receptacles that have to be moved in making the particular change required. The operator now pushes handle 55 back from the normal position indicated by position of line $55^a$ in Fig. 6 to the position indicated by line $55^c$ in said figure. The first effect of this movement is through lug 75 to depress the wing 71, allowing the selectors to fall, and each of the selector-needles 49 that finds a complete series of holes through all the permutating-segments will pass to the position shown at $49^b$, the corresponding selector-lever assuming then the position shown at $47^b$, with the lower end of the selector-slide 50 in the path of operating bail or frame 57. Any selector-needle whose inward movement is opposed by either the deposit or any of the purchase segments will be stopped short of the position required to bring the corresponding selector into engaging relation with the operating-bail. This initial movement of the handle 55 also through wing 93 lifts the deposit-links 30 out of engaging relation with the escapements 22. During these operations the link 58 has been moving up from the position shown in Fig. 2 to that shown in Fig. 6 at $58^b$, the handle being then in the position indicated by line $55^b$. As said link reaches this position the end of its slot 60 strikes the pin 59, and further movement of the operating-handle, operating-shaft, and link results in lifting the bail 57 and raising those selector-slides 50 which have been brought into coöperative relation therewith from the position indicated at $50^b$ to the position $50^c$ in Fig. 6. The upper ends of such selector-slides strike in this movement the corresponding escapements and rock same from position $22^b$ to position $22^c$, thereby freeing the corresponding cash-receptacles, which turn back under the influence of springs 14 from position 6 to position indicated in dotted lines $6^c$. The operator then pulls handle 55 forward again, allowing bail 57 to fall away from the operated selector-slides, the latter falling back and the escapement 22 rocking under the action of its spring to its normal position, allowing the operated cash-wheels to move a farther distance to complete one full backward step. The backward movement of the receptacle brings one charged pocket of such receptacle back opposite the opening 4, and the money in such pocket will thereupon fall into the trough 5. The return movement of the handle also operates through link 58 and bail 98 to reset the permutating devices, allowing the purchase-keys to return to normal position, and by the action of latch 90 dogs 80 are raised and reëngaged with springs 33, the latter at the same time returning to normal position and link-plates 30 also returning to engagement with the escapements by reason of such movement of the springs 33 and by the turning back of wing 93. As the plates 30 are so returned to normal position the device 108 moves back to lock the purchase-keyboard. Return movement of the operated units-key has also resulted in relocking the operating-handle by devices 111 113. If deposits in any wheel are in excess of the capacity of that wheel, then the surplus will be dropped from the cash-receptacles as charged pockets in same come over the discharge-point $x$, where the money is allowed to fall into a suitable locked receptacle. The operation of registering is performed in the movement of the purchase-segments when released by the operation of the purchase-keys, the ratchets of the register-wheels slipping during the resetting movement of said segments. When the purchase-segments have been released and stopped by the keys, type 154 are brought into position opposite the printing-hammer 168 corresponding to the purchase-keys depressed and the subsequent operation of the handle 55 operates through link 58 and lever 166 to effect the printing operation.

While I have shown the cash-receptacles themselves as constituting the means operated on the deposit of money to control the delivery of change, I may, as far as the balance of my invention is concerned, use any suitable deposit devices for this purpose, and such deposit devices may be separate from the cash-receptacle—for example, like the devices for this purpose in the patent to Isaac S. Dement and myself, No. 618,932, dated February 7, 1899.

What I claim as my invention, and desire to secure by Letters Patent, is—

1. In a mechanical cashier, the combination with deposit devices operated in accordance with the deposit of money in the machine, and purchase-keyboard mechanism, of selecting means controlling the delivery of money from the machine, and permutating devices controlled by the deposit devices and by the purchase-keyboard mechanism and adapted to stop the movement of the selecting devices to control the delivery of money.

2. In a mechanical cashier, the combination with cash-receptacles and means to cause delivery of money therefrom, adapted to be operated upon the deposit of money in the cash-receptacles, and purchase-keyboard mechanism, of a perforated permutating frame or plate controlled by the deposit devices, perforated permutating frames or plates controlled by the purchase-keyboard mechanism, selecting devices coöperating with all of said permutating frames or plates and having needles adapted to enter the perforations therein or to be stopped by the unperforated portions thereof, an operating device, selecting means movably supported on the selecting devices and adapted to be brought into coöperative relation with the operating device when the corresponding needles pass through the perforations in all the permutating frames or plates, and means operated by said selecting means to control the money-delivery means.

3. The combination with deposit devices adapted to be operated upon deposit of money in the machine, and means for causing delivery of money from the machine, of selecting devices controlling the operation of the money-delivery means and comprising selector-needles, and a movable plate controlled by the deposit devices and provided with perforations coöperating with said needles to control the action of the selecting devices.

4. The combination with cash-receptacles and means for causing the delivery of money therefrom, and keyboard mechanism, of a movable plate controlled by said keyboard mechanism and provided with perforations, and selecting devices controlling the money-delivery means and carrying means coöperating with such perforations to control the action of the selecting devices.

5. The combination with cash-receptacles and means for causing the delivery of money therefrom, and keyboard mechanism, of a plurality of superimposed relatively movable plates, controlled by said keyboard mechanism, and selecting devices coöperating with said movable plates and controlling the action of the money-delivery means.

6. The combination with the cash-receptacles, of means for controlling the delivery of money therefrom, comprising a plurality of perforated concentrically-pivoted segmental superimposed plates and selecting devices coöperating with said plates and with the perforations therein.

7. The combination with the cash-receptacles, of means for controlling the delivery of money therefrom, comprising a plurality of perforated superimposed plates and selecting devices carrying means coöperating with the said plates and with the perforations therein.

8. The combination with the cash-receptacles, of means for controlling the delivery of money therefrom comprising a plurality of superimposed perforated segment-plates and selecting devices carrying needles coöperating with said plates.

9. The combination with money-delivery means, of a plurality of selector means adapted to operate such money-delivery means, an operating means, selecting devices carrying the aforesaid selector means and adapted to move them into or out of position to be operated by the operating means, and a movable plate or frame coöperating with and controlling the said selecting devices.

10. The combination with money-delivery means, of a plurality of selector means adapted to cause operation of the money-delivery means, an operating means, selecting devices carrying said selector means, and adapted to move them into or out of position to be operated by the operating means, and a plurality of movable, perforated plates or frames coöperating with said selecting devices to control the position of the selector means.

11. In a permutating and selecting mechanism for mechanical cashiers, the combination of a plurality of superimposed relatively shiftable perforated plates or frames, and a plurality of selecting devices carrying projections coöperating with said plates or frames and adapted to pass through the perforations in said plates or frames or to be stopped by the unperforated parts thereof, according to the positions of the plates or frames, substantially as described.

12. In a permutating and selecting mechanism for mechanical cashiers, the combination with a plurality of superimposed and relatively shiftable perforated plates and means for controlling their relative positions; of money-selecting means comprising needle devices adapted to coöperate with said plates and to pass through the perforations thereof or to be stopped by unperforated parts of the same, according to the positions of the plates, substantially as described.

13. A permutating and selecting mechanism for mechanical cashiers, comprising a plurality of perforated plates or frames, and a plurality of selecting devices carrying projections coöperating with said plates or frames, and adapted to pass through the perforations in said plates or to be stopped by the unperforated parts thereof, according to the positions of the plates, and controlling means for adjusting the positions of the plates, said controlling means comprising a purchase-keyboard having keys arranged in groups and controlling respectively a plurality of the said plates.

14. A permutating and selecting mechanism for mechanical cashiers, comprising a plurality of perforated plates or frames, and a plurality of selecting devices carrying projections coöperating with said plates or frames, and adapted to pass through the perforations in said plates or to be stopped by the unperforated parts thereof, according to the positions of the plates, and controlling means for adjusting the positions of the plates, said controlling means comprising a purchase-keyboard having keys arranged in groups and controlling respectively a plurality of the said plates, and deposit devices controlling another of said plates.

15. The combination with a plurality of keys, of permutating devices, and money-delivery means controlled thereby, means for operating said permutating devices, means controlled by the keys to release and stop the permutating devices, and reset means for resetting the permutating devices.

16. The combination with means controlling money-delivery and comprising a movable frame, and selecting means coöperating with said frame in different positions of the latter to variably control the money-delivery, of means for moving said frame, a plurality of key devices for stopping said frame in different positions, and reset means for resetting the movable-frame devices.

17. The combination with means controlling money-delivery, comprising a plurality of movable frames, and selecting devices coöperating with said frames in different relative positions of the latter to variably control the money-delivery, of springs for moving said frames, and a plurality of key devices arranged in sets, detent means controlled by the keys of each set to hold and release the corresponding one of the frames, the respective keys of a set being adapted to variably stop the frame so released, said movable frames being concentrically pivoted and said keys being arranged in concentric relation to said frames.

18. The combination with a plurality of keys, of permutating devices, and money-delivery means controlled thereby, means for operating said permutating devices and means controlled by the keys to release and stop the permutating devices.

19. The combination with means controlling money-delivery and comprising a movable frame, and selecting means coöperating with said frame in different positions of the latter to variably control the money-delivery, of means for moving said frame, and a plurality of key devices for stopping said frame in different positions.

20. The combination with means controlling money-delivery, comprising a movable frame, and selecting means coöperating with said frame in different positions of the latter to variably control the money-delivery, of a spring for moving said frame, and a plurality of key devices for releasing said frame and stopping the same.

21. The combination with means controlling money-delivery, comprising a plurality of movable frames, and selecting devices coöperating with said frames in different relative positions of the latter to variably control the money-delivery, of springs for moving said frames, and a plurality of key devices arranged in sets, detent means controlled by the keys of each set to hold and release the corresponding one of the frames, and the respective keys of a set being adapted to variably stop the frame so released.

22. In a mechanical cashier, the combination with deposit devices and money-delivering means, of a selecting mechanism controlling said delivery means, a movable frame coöperating therewith to control the delivery of money, and adapted to move when released, means for releasing said frame, and dogging devices operated by the respective deposit devices and acting to arrest the motion of said frame at different distances of travel thereof.

23. In a mechanical cashier, the combination with money-delivery means, of a selecting mechanism controlling said delivery means, a movable frame coöperating therewith to control the delivery of money and adapted to move when released, of a plurality of keys, adapted when operated to stop the said frame in different positions, and means controlled by said keys to release the said frame.

24. In a mechanical cashier, the combination with money-delivery means, of a selecting mechanism controlling said delivery means, a movable frame coöperating therewith to control the delivery of money and adapted to move when released, of a plurality of keys, adapted when operated to stop the said frame in different positions, and means controlled by said keys to release the said frame; said means consisting of a yielding detent-plate extending adjacent to the keys to be engaged by same and having a part engaging with the aforesaid movable frame.

25. In a mechanical cashier, the combination with money-delivery means, of a selecting mechanism controlling said delivery means, a movable frame coöperating therewith to control the delivery of money and adapted to move when released, of a plurality of keys, adapted when operated to stop the said frame in different positions, said keys having shoulders engaging with the said frame to hold the keys in operated position, and restoring-springs for the keys.

26. In a mechanical cashier, the combination with deposit devices and money-delivery means, of a selecting mechanism controlling said delivery means, a movable frame coöperating therewith to control the delivery of money, and adapted to move when released, and means for releasing said frame, consisting of a key and means controlled thereby engaging with said frame.

27. In a mechanical cashier, the combination with money-delivery means, of a selecting mechanism controlling said delivery means, a movable frame coöperating therewith to control the delivery of money and adapted to move when released, of a plurality of keys, adapted when operated to stop the said frame in different positions, said keys having locking means to hold the keys in operated position, and restoring-springs for the keys.

28. In a mechanical cashier, the combination with a rotary cash-receptacle, mounted to rotate in a vertical plane, of a fixed plate attached to the frame of the machine arranged at the side of said receptacle closing it at the side.

29. In a mechanical cashier, the combination with a rotary receptacle, mounted to rotate in a vertical plane and having pockets, of a fixed plate arranged at the side of same and having a cut-away portion below, closing the receptacle at the side except at such cut-away portion.

30. A movable cash-receptacle for mechanical cashiers comprising a plurality of series of pockets, the pockets of one series overlapping those of an adjacent series.

31. A rotary cash-receptacle for mechanical cashiers comprising a plurality of series of pockets, the pockets of adjacent series being arranged in different angular positions.

32. A cash-receptacle mounted to rotate in a vertical plane and comprising a plurality of pockets with intervening walls inclined to the radial direction, substantially as and for the purposes set forth.

33. In a mechanical cashier, the combination with the rotary cash-receptacles, provided with returning-springs, of escapements controlling their return movement, means for controlling the delivery of money, connecting means connected to said controlling means and adapted to be engaged by said escapement, and means for releasing the engagement of said connecting means with said escapement.

34. The combination with the cash-receptacles, provided with returning-springs, of escapements for said receptacles controlling their return movement, permutating and selecting devices, operating means acting through the selecting devices to control the escapements, connecting means adapted to be engaged by the escapements and to control the permutating and selecting means, and means operated by the aforesaid operating means to disengage the said connecting means from the escapements.

35. In a mechanical cashier, the combination with money-delivering means and selecting devices controlling the operation of same, of an alternating device adapted to coöperate with said selecting devices to render some inoperative and others operative, and comprising rotary, toothed, devices, one of which has twice as many teeth as the other, deposit devices controlling the action of the selecting devices, means operated by a deposit device to operate the wheel having the greater number of teeth and a resetting device engaging with the wheel having the less number of teeth.

36. In a mechanical cashier, the combination with deposit devices, money-delivering means, main operating means and selecting devices controlling the operation of the money-delivering means, of an alternating device having alternately-arranged wings controlling the said selecting devices, and means, other than said wings coöperating with the deposit devices and with the main operating means to operate and reset the alternating device.

37. The combination of the rotary cash-receptacles provided with return-springs, escapement mechanism for said receptacles, a perforated deposit-segment and a plurality of perforated purchase-segments concentrically supported and superimposed, means for moving said segments when released, dogs stopping the movement of the deposit-segment, connecting means operating said dogs and operated by said escapements, purchase-keyboard mechanism controlling the release of all the segments and acting to stop the purchase-segments, selecting-levers having needles engaging the said perforated segments, selector-bars mounted to slide on said levers and adapted to engage the escapements and operating means adapted to engage and operate said selector-bars when the needles of the selecting-levers traverse holes in all said segments.

38. In a mechanical cashier, the combination with the movable cash-receptacles and the purchase-keyboard mechanism, of a locking device for the said keyboard mechanism, and means connected to said locking device and engaged by said cash-receptacle and operated by the movement thereof to unlock the keyboard mechanism.

CHARLES F. BASSETT.

Witnesses:
J. GREEN,
A. P. KNIGHT.